United States Patent Office 3,297,636
Patented Jan. 10, 1967

3,297,636
THERMOPLASTIC LINEAR POLYSULFONATES FROM DI(HYDROXYPHENYL) VALERIC ACID
André Jan Conix, Wilrijk-Antwerp, Belgium, assignor to Gevaert Photo-Producten N.V., Mortsel, Belgium, a Belgian company
No Drawing. Filed Feb. 9, 1962, Ser. No. 172,078
Claims priority, application Belgium, Feb. 10, 1961, 40,441, Patent 600,053
5 Claims. (Cl. 260—49)

This invention relates to high molecular weight, thermoplastic, linear, aromatic polysulfonates, to their preparation and to films, fibres and other shaped articles manufactured from these polysufonates.

From the Belgian patent specification No. 565,478 it is known to prepare high molecular weight polysulfonates by reaction of a diacid halide of an aromatic disulfonic acid with a metal salt of defined diphenols. The best results are obtained in a two-phase reaction whereby the diacid halide of the aromatic disulfonic acid is dissolved in an organic liquid and the metal salt of the diphenol is dissolved in a liquid which is immiscible with the solvent for the diacid halide.

It has now been found to obtain new polysulfonates with very special properties by using as a diphenol 4,4-di(4-hydroxyphenyl)-n-valeric acid of the formula:

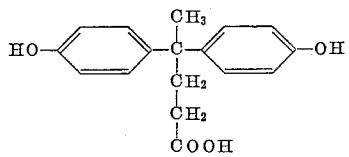

The polysulfonates of the invention are thus obtained by reaction of a diacid halide of an aromatic disulfonic acid which is dissolved or dispersed in an inert organic liquid with a metal salt of 4,4-di(4-hydroxyphenyl)-N-valeric acid, dissolved in a liquid which is immiscible with the solvent for the diacid halide, whereby the diacid halide of the aromatic disulfonic acid corresponds to the following formula:

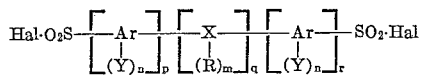

wherein:
Hal represents a chlorine atom or a bromine atom,
Ar represents an aromatic group such as a phenylene group, a diphenylene group or a naphthylene group,
X represents an alkylene group or an alkylidene group such as a methylene group, an ethylene group, a propylene group, an ethylidene group, a propylidene group and an isopropylidene group, a sulfur containing radical such as a sulfide group (—S—), a sulfinyl group (—SO—), or a sulfonyl group (—SO$_2$—), an ether radical (—O—), a carbonyl radical (—CO—) or a tertiary amino radical (—N(alk)—), two or more alkylene or alkylidene groups which are bound together by an aromatic radical, a tertiary amino radical, an ether radical, a carbonyl radical or a sulfur containing radical such as a sulfide radical, a sulfinyl radical or a sulfonyl radical,
R represents a hydrogen atom, an alkyl group such as a methyl group or an ethyl group, an aryl group such as a phenyl group or a naphthyl group, an aralkyl group such as a benzyl group or a phenyl ethyl group, an alkyl substituted aryl group or a cycloaliphatic group, and whereby all these groups can be halogen substituted,
Y represents a halogen atom, a nitro group, an OR-radical or a R-radical whereby R has the same significance as set forth above,
n is a positive integer which may vary from 0 to the number of replaceable hydrogen atoms of the aromatic nucleus,
m is a positive integer which may vary from 0 to the number of replaceable hydrogen atoms of X,
p is a positive integer of at least 1,
q is 0 or 1, and
r is a positive integer which may be 0 if q is also 0.

If in the disulfohalides according to the formula more than one R- and/or Y-substituent is present, these substituents can be equal or different.

The halogensulfonyl groups and the Y-substituents of the aromatic nuclei can occur on the ortho-, meta- or para-places.

Suited examples of disulfohalides which can be used as starting material are the following:

1,4-dichlorosulfonyl benzene
1,3-dichlorosulfonyl benzene
1,2-dichlorosulfonyl benzene
2,4-dichlorosulfonyl naphthalene
2,7-dichlorosulfonyl naphthalene
4,4'-dichlorosulfonyl diphenyl
2,2'-dichlorosulfonyl diphenyl
4,4'-dichlorosulfonyl diphenyl ether
1,1-di(4-chlorosulfonyl phenyl)-methane
di(4-chlorosulfonyl phenyl)-sulfone
di(3-chlorosulfonyl phenyl)-sulfone
2,2-di(4-chlorosulfonyl phenyl)-propane
1,3-dichlorosulfonyl-4,5-dichloro benzene
1,3-dichlorosulfonyl-4,6-dichloro benzene
1,3-dichlorosulfonyl-4,5,6-trichloro benzene
1-methyl-2,4-dichlorosulfonyl benzene
1,3-dimethyl-4,6-dichlorosulfonyl benzene It is evident that for preparing the polysulfonates according to the present invention, there can be started from a mixture of diacid halides of different aromatic disulfonic acids and that the metal salt of 4,4-di(4-hydroxyphenyl)-n-valeric acid can also be replaced partially by metal salts of other diphenols.

The high molecular weight thermoplastic polysulfonates according to the invention contain structural units of the following formula:

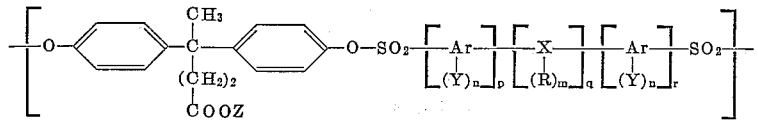

wherein:
Z represents a hydrogen atom or an alkali metal atom such as a sodium atom, and
Ar, X, Y, R, n, m, p, q and r have the same significances as is set forth above.

Water is used as a solvent for the alkali derivative of 4,4-di(4-hydroxyphenyl)-n-valeric acid, hereinafter called as the alkalidiphenate. Halogenated hydrocarbons such as methylene chloride, chloroform, 1,2-dichloroethane, 1,1,2-tri-chloroethane, sym-tetrachloroethane, methylchloroform, dichloroethylene etc, are used as usual solvents for the disulfohalide. Other organic solvents which are immiscible with water such as benzene, toluene etc. can also be used either alone or in mixtures with the above organic solvents.

As in Belgian patent specification 563,173 the reaction is preferably carried out in the presence of a catalyst in order to accelerate the reaction and to promote the formation of high molecular weight reaction products.

As examples of suited catalysts onium compounds may be mentioned such as quaternary ammonium compounds, tertiary sulfonium compounds, quaternary phosphonium compounds and quaternary arsonium compounds. The catalyst can be added in amounts varying from 0.01 to 5% based on the weight of the diphenate. The best suited catalysts are soluble in the aqueous phase as well as in the organic phase. They can be added to the reaction mixture before, during or after mixing both phases.

The reaction can be carried out at temperatures varying from the freezing point of the reaction mixture to the boiling points of the used solvents.

For carrying out the reaction the disulfohalide is dissolved or dispersed in the organic solvent. The disulfohalide is dispersed when it is only sparingly soluble in the organic phase. Thereupon an aqueous solution of the alkali diphenate is added. The solution or dispersion of the disulfohalide can also be added to the aqueous solution of the diphenate.

In the condensation reaction according to the present invention the amount of disulfohalide has to correspond stoichiometrically with the used amount of diphenate although high molecular weight products can also be obtained with a small excess of disulfohalide or a small excess of diphenate.

Contrary to the common polysulfonates, the polysulfonates according to the present invention are insoluble in acid aqueous medium but are soluble in slightly alkaline medium e.g. in photographic developing baths. Just because of this characteristic they are suited for being used as binding agents in photographic anti-halation layers, filter layers, antistatic layers, protective layers which are soluble in the photographic baths, etc.

According to their structure, the polysulfonates of the invention are also soluble in ethanol, acetone, dioxane, methylene chloride etc. so that they can be applied from these solvents as protective layers to photographic materials.

The polysulfonates according to the invention can further be applied as protective layers onto many kinds of materials, as sizing agents and as antistatic agents in the textile industry and the plastic industry.

The following examples illustrate the present invention:

*Example 1*

A solution of 14.3 g. (0.05 mol) of 4,4-di(4-hydroxyphenyl)-n-valeric acid in 100 cm.$^3$ of distilled water is placed in a three-necked flask of 500 cm.$^3$, fitted with a stirrer and a dropping funnel. Then, 15.9 (0.15 mol) of anhydrous sodium carbonate and 1 g. of triethylbenzyl ammonium chloride are added.

While stirring, a solution of 13.75 g. (0.05 mol) of 1,3-dichlorosulfonyl benzene in 40 cm.$^3$ of methylene chloride is dropwise added at room temperature.

Stirring of the reaction mixture is continued for 2 hrs. The mixture separates into an organic and an aqueous layer, the latter containing the formed polymer. The methylene chloride is vacuum evaporated from the aqueous layer which becomes viscous. Thereupon distilled water is added to this aqueous solution to make it thinly liquid.

While strongly stirring this solution is poured into a solution of 50 cm.$^3$ of hydrochloric acid in 1 l. of water. The polymer is precipitated in its acid form and is then separated. Yield: 20 g.

The polymer in its acid form is soluble in dioxane, dimethyl formamide, tetrahydrofurane and in a mixture of equal parts of ethylacetate and tetrahydrofurane (50/50). After the conversion into its sodium salt, the polymer is soluble in water.

The intrinsic viscosity of the polymer measured in dioxane at 25° C. amounts to 0.083 dl./g.

*Example 2*

A solution of 14.3 g. (0.05 mol) of 4,4-di-(4-hydroxyphenyl)-n-valeric acid in 100 cm.$^3$ of distilled water is placed in a three necked flask of 500 cm.$^3$, fitted with a stirrer and a dropping funnel. Then 15.9 g. (0.15 mol) of anhydrous sodium carbonate and 1 g. of triethylbenzyl ammonium chloride are added.

While stirring, a solution of 15.15 g. of 1,3-dimethyl-4,6-dichlorosulfonyl benzene in 40 cm.$^3$ of methylene chloride is dropwise added at room temperature.

Thereupon the reaction mixture is still stirred for 2 hrs. whereupon the mixture separates in two liquid layers.

Stirring of the reaction mixture is continued for 2 hrs. The mixture separates into an organic and an aqueous layer, the latter containing the formed polymer. The methylene chloride is vacuum evaporated from the aqueous layer which becomes viscous. Thereupon distilled water is added to this aqueous solution to make it thinly liquid.

This solution is poured while thoroughly stirring into a solution of 50 cm.$^3$ of hydrochloric acid in 1 l. of water.

The polymer is separated in its acid form and dried. Yield: 21 g.

After being converted into its sodium salt the polymer is soluble in water. The polymer in its acid form is soluble in dioxane, dimethyl formamide and tetrahydrofurane.

*Example 3*

A solution of 14.3 g. (0.05 mol) of 4,4-di(4-hydroxyphenyl)-n-valeric acid in 100 cm.$^3$ of distilled water is placed in a three-necked flask of 500 cm.$^3$, fitted with a stirrer and a dropping funnel. Then 15.9 g. (0.15 mol) of anhydrous sodium carbonate and 1 g. of triethylbenzyl ammonium chloride are added.

While stirring, a solution of 6.875 g. (0.025 mol) of 1,3-dichlorosulfonyl benzene and 8.775 g. (0.025 mol) of 4,4'-dichlorosulfonyl diphenyl in 40 cm.$^3$ of methylene chloride is dropwise added at room temperature.

The reaction mixture is then still stirred for 2 hrs. whereupon the mixture separates in two phases.

The mixture is washed several times with methylene chloride, the aqueous layer is decanted and the remaining methylene chloride is removed from the aqueous phase by vacuum-distillation. The viscous aqueous solution is diluted with distilled water until it is thinly liquid. While thoroughly stirring, the solution is poured out into a solution of 50 cm.$^3$ of hydrochloric acid in 1 l. of water.

The polymer is separated in its acid form and dried. Yield: 70% of the theoretically calculated amount. This polymer is soluble in dioxane, dimethyl formamide and tetrahydrofurane. After the conversion into its sodium salt, the polymer is soluble in water.

The intrinsic viscosity of the polymer, measured in dioxane at 25° C. amounts to 0.062 dl./g.

*Example 4*

A solution of 14.3 g. (0.05 mol) of 4,4-di(4-hydroxyphenyl)-n-valeric acid in 100 cm.$^3$ of distilled water is placed in a three-necked flask of 500 cm.$^3$, fitted with a stirrer and a dropping funnel. Then 15.9 g. (0.15 mol) of anhydrous sodium carbonate and 1 g. of triethylbenzyl ammonium chloride are added.

While stirring, a solution of 7.575 g. (0.025 mol) of 1,3-dimethyl-4,6-dichlorosulfonyl benzene and 6.875 g. (0.025 mol) of 1,3-dichlorosulfonyl benzene in 50 cm.$^3$ of methylene chloride is dropwise added at room temperature. The mixture is still stirred for 2 hours and separation takes place in an organic phase and in an aqueous phase which contains the dissolved polymer. The aqueous phase is washed with pure methylene chloride and after decanting the supernatant aqueous layer, the remaining methylene chloride is completely removed therefrom by vacuum distillation.

The viscous aqueous solution is diluted with distilled water until it is thinly liquid. While thoroughly stirring the solution is poured into a solution of 50 cm.³ of hydrochloric acid in 1 l. of water. The polymer precipitates in its acid form and is then separated and dried.

This polymer is soluble in dioxane, dimethyl formamide, tetrahydrofurane and in mixtures of ethyl acetate and tetrahydrofurane (50/50), alcohol and dioxane (90/10) and of alcohol, ethyl acetate and isopropanol (60/10/30). After the conversion into its sodium salt the polymer is soluble in water.

Example 5

14.3 g. (0.05 mol) of 4,4-di(4-hydroxyphenyl)-n-valeric acid are dissolved in 100 cm.³ of distilled water and placed in a three-necked flask of 500 cm.³, fitted with a stirrer and a dropping funnel. Then 15.9 g. (0.15 mol) of anhydrous sodium carbonate and 1 g. of triethylbenzyl ammonium chloride are added.

While stirring a solution of 14.45 g. (0.05 mol) of 1-methyl-2,4-dichlorosulfonyl benzene in 40 cm.³ of methylene chloride is dropwise added at room temperature. The mixture is still stirred for 3 hours. Then the obtained aqueous phase containing the dissolved polymer is separated and washed several times with methylene chloride. The methylene chloride is then removed from the aqueous solution by vacuum-distillation.

The viscous aqueous solution is diluted with distilled water until it is thinly liquid. The solution is then poured into a solution of 50 cm.³ of hydrochloric acid in 1 l. of water. The polymer is separated in its acid form and dried. Yield: 12 g.

The polymer is soluble in dioxane, dimethyl formamide, tetrahydrofurane, a mixture of dioxane and ethanol (60/40) and a mixture of ethanol, ethyl acetate and isopropanol (30/40/30). After the conversion into its sodium salt, the polymer is soluble in water.

Example 6

11 g. (0.04 mol) of 1,3-dichlorosulfonyl benzene, 0.5 g. of triethylbenzyl ammonium chloride and 50 cm.³ of distilled methylene chloride are placed in a three-necked flask of 250 cm.³, fitted with a stirrer and a dropping funnel.

Then a solution of 8.938 g. (0.0392 mol) of 2,2-di(4-hydroxyphenyl)-propane and 0.229 g. of 4,4-di(4-hydroxyphenyl)-n-valeric acid in 81.6 cm.³ of sodium hydroxide N is added dropwise. Thereupon, the reaction mixture is still stirred for 2 hours at room temperature.

After separation of the mixture in two phases, it is washed with distilled water.

Then the —COONa groups of the polyester are converted into the acid form by using 30 cm.³ of dioxane and 10 cm.³ of hydrochloric acid while stirring for at least 1 hr. The mixture is washed with distilled water and then poured into boiling water. The polymer is film-forming and soluble in methylene chloride and sym-tetrachlorofurane.

Example 7

A solution of 14.3 g. (0.05 mol) of 4,4-di(4-hydroxyphenyl)-n-valeric acid in 50 cm.³ of distilled water is placed in a three-necked flask of 500 cm.³, fitted with a stirrer and a dropping funnel. To this solution are added 20.14 g. (0.19 mol) of anhydrous sodium carbonate and 1 g. of triethylbenzyl ammonium chloride.

While stirring, a solution of 8.25 g. (0.03 mol) of 1,3-dichlorosulfonyl benzene and 8.78 g. (0.02 mol) of 2,2'-dichlorosulfonyl diphenyl in methylene chloride is added dropwise at room temperature.

The mixture is still stirred for 3 hrs. No separation appears. The methylene chloride is removed by vacuum-distillation. The aqueous solution is then diluted with distilled water and poured into a solution of 50 cm.³ of hydrochloric acid in 1 l. of water. The polymer precipitates in its acid form. Yield: 21 g. The polymer is soluble in alkali.

I claim:

1. A high molecular weight thermoplastic linear polysulfonate containing recurring units of the following formula:

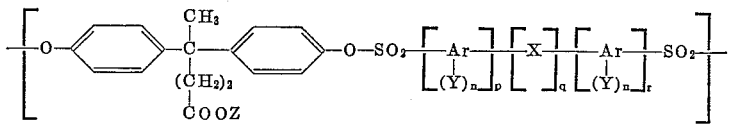

wherein:
Ar is a member of the group consisting of a phenylene group and a naphthylene group,
Z is a member of the group consisting of a hydrogen atom and an alkali metal atom,
X is a member of the group consisting of an alkylene group, an oxygen atom, and a sulfone group,
Y is a member of the group consisting of a halogen atom and a lower alkyl group,
$n$ is an integer from 0 to the number of replaceable hydrogen atoms of Ar,
$p$ is 1,
$q$ is 0 or 1, and
$r$ is 0 or 1.

2. A high molecular weight thermoplastic linear polysulfonate containing recurring units of the formula

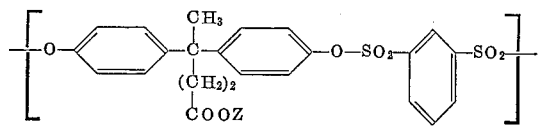

wherein Z is a member selected from the group consisting of a hydrogen atom and an alkali metal atom.

3. A high molecular weight thermoplastic linear polysulfonate containing recurring units of the formula

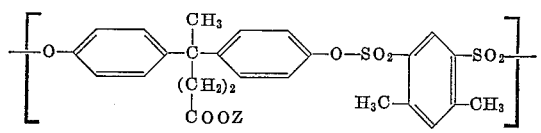

wherein Z is a member selected from the group consisting of a hydrogen atom and an alkali metal atom.

4. A high molecular weight thermoplastic linear polysulfonate containing recurring units of the formula

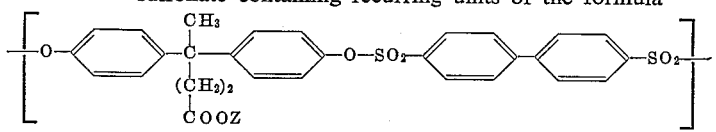

wherein Z is a member selected from the group consisting of a hydrogen atom and an alkali metal atom.

5. A high molecular weight thermoplastic linear polysulfonate containing recurring units of the formula

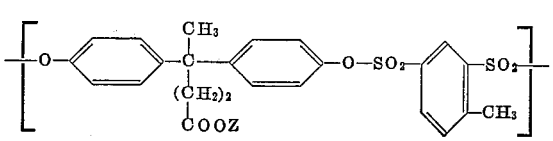

wherein Z is a member selected from the group consisting of a hydrogen atom and an alkali metal atom.

References Cited by the Examiner

UNITED STATES PATENTS 2,933,472  4/1960  Bader _____ 260—47
3,132,118  5/1964  Butterworth _____ 260—47 X

FOREIGN PATENTS 565,478  3/1958  Belgium.
585,882  6/1960  Belgium.

WILLIAM H. SHORT, *Primary Examiner.*
JOSEPH R. LIBERMAN, *Examiner.*
T. KERWIN, J. C. MARTIN, *Assistant Examiners.*